United States Patent
Wugofski (12) 
(10) Patent No.: US 6,567,106 B1
(45) Date of Patent: *May 20, 2003

(54) MULTIPURPOSE CHANNEL BANNER

(75) Inventor: Theodore D. Wugofski, Fort Worth, TX (US)

(73) Assignee: Amiga Development LLC, Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 757 days.

(21) Appl. No.: 09/002,733

(22) Filed: Jan. 5, 1998

(51) Int. Cl.$^7$ .................................................. G06F 3/14
(52) U.S. Cl. ........................ 345/764; 345/716; 345/723; 345/804; 345/714
(58) Field of Search ................................ 345/327, 328, 345/346, 716, 714, 723, 804, 805, 764; 348/10, 12, 13, 569, 906

(56) References Cited

U.S. PATENT DOCUMENTS

| | | | |
|---|---|---|---|
| 5,585,866 A | * 12/1996 | Miller et al. ................. 348/906 |
| 5,625,406 A | 4/1997 | Newberry et al. ............. 348/7 |
| 5,710,601 A | * 1/1998 | Marshall et al. ............ 348/564 |
| 5,731,844 A | * 3/1998 | Rauch et al. ................. 348/10 |
| 5,751,282 A | * 5/1998 | Girard et al. ................ 345/327 |
| 5,793,438 A | * 8/1998 | Bedard ......................... 348/13 |
| 5,796,945 A | * 8/1998 | Tarabella ..................... 345/327 |
| 5,818,438 A | * 10/1998 | Howe et al. ................. 345/327 |
| 5,819,156 A | * 10/1998 | Belmont ...................... 345/327 |
| 5,828,839 A | * 10/1998 | Moncreiff .............. 395/200.34 |
| 5,850,218 A | * 12/1998 | Lajoie .......................... 348/13 |

* cited by examiner

*Primary Examiner*—Kristine Kincaid
*Assistant Examiner*—Thomas T. Nguyen
(74) *Attorney, Agent, or Firm*—Rod Lacy; Mark S. Walker (57) ABSTRACT

A convergence system that displays channel banners that assume the same form regardless of the source. Accordingly, a computer-readable medium having computer-executable components stored thereon for execution on a suitably equipped computerized system is described. The components include a television services component for receiving a plurality of inputs from a plurality of sources. Each input includes a corresponding data set. Also, a user interface component is included for providing a partial-screen graphical user interface in response to the data set of a selected source. The graphical user interface includes a basic field for display in a form regardless of the selected source.

16 Claims, 9 Drawing Sheets

MULTIPURPOSE CHANNEL BANNER

RELATED APPLICATIONS

This application relates to the co-pending, co-filed, and co-assigned applications entitled "System for using a channel and event overlay for invoking channel and event related functions, Ser. No. 09/002,987, filed Jan. 5, 1998" "Controlling the layout of graphics in a television environment, Ser. No. 09/002,994, filed Jan. 5, 1998 now U.S. Pat. No. 6,201,538" "Displaying layered information using lenticular-like interfaces, Ser. No. 09/002,901, filed Jan. 5, 1998 now U.S. Pat. No. 644,898" and "Mutatably transparent controls, Ser. No. 09/002,986, filed Jan. 5, 1998 now U.S. Pat. No. 5,933,141" all of which are hereby incorporate by reference.

BACKGROUND OF THE INVENTION

The present invention relates to convergence systems. Specifically, the present invention relates to a convergence system with a channel banner overlay.

A convergence system refers to a system that includes capabilities that are otherwise provided by separate systems. For example, the Gateway Destination PC/TV system provides for both computer and television capability. Multiple devices and inputs are brought together in one system which typically makes use of one display. At its most basic level, a user of a convergence system may alternate between television programming and a computer program on a particular video monitor. Typically, however, a convergence system brings together several television inputs such as radio-frequency, satellite, cable, or digital television. In addition to running computer programs, a convergence system may access a wide area network such as the Internet. The convergence system may also bring together several consumer electronic devices such as video cassette recorders, laser disc players, video cameras, game modules, or the like. The user can access these inputs and devices through a multi-function remote control. Thus, switching between devices of a convergence system, and between the channels or events corresponding with the device, can be as seamless as switching between channels of a typical television system.

The multitude of available television channels can be overwhelming without a means to handle information regarding the channels or events. A user of such information can find it very difficult to remember information about many channels and events. The practice of rapidly changing, commonly referred to as "surfing," the channels and events can be both time consuming and distracting, and not much information can be gleaned about a channel based on a short glimpse of a scene in such a fashion. Therefore, the components of a convergence system typically employ channel banners, which are outputs that provide information regarding a specific channel or event in fields beside the corresponding video on that channel. Such information in the fields of the channel banner can include the name of the channel and the title of the program being watched. Those skilled in the art now know that a convergence system can permit a viewer to watch a particular channel and still "surf" channel banners of other channels. Thus, the viewer can scan the channels without interrupting the program being watched and determine what events are available on other channels.

In a convergence system, the information handling system is required to be more sophisticated than a simple channel banner scheme. Not only are there many channels per source, but there are many sources in a convergence system, each with corresponding channels and events. Each channel or event provides different information to the channel banner, and each source has different requirements for its fields on the channel banner.

In prior art convergence systems, switching between sources typically involves changing the form of the channel banner. Each source provides its own channel banner and displayed information specific to that source. Switching between sources is less than seamless because the user is required to search the screen for specific information in the channel banner. For example, a field that indicates the source can be in the upper-left corner of the screen for the video cassette recorder but in the lower-middle of the screen for the satellite television. Multiple fields for each source compound the problem as similar information regarding each source is scattered over the screen. An inconvenience is created when the user must search the channel banner for information when switching between sources.

SUMMARY OF THE INVENTION

The present invention is directed to a convergence system that displays channel banners that assume the same form regardless of the source.

One aspect of the present invention includes a computer-readable medium having computer-executable components stored thereon for execution on a suitably equipped computerized system. The components include a television services component for receiving a plurality of inputs from a plurality of sources. Each input includes a corresponding data set. Also, a user interface component is included for providing a partial-screen graphical user interface in response to the data set of a selected source. The graphical user interface includes a basic field for display in a form regardless of the selected source.

Another aspect of the present invention is a method suitable for use with a convergence system. One step in the method includes providing a plurality of sources, each source having an input having associated therewith a set of information. Another step is displaying a channel banner having a plurality of fields for receiving and displaying at least some of the set of information. Additionally, the method includes selecting one of the plurality of sources. Also, the method includes displaying at least some of the set of information from the selected source in the plurality of the fields. The plurality of fields retains a consistent form regardless of the selected source.

Still another aspect of the invention is a convergence system. The convergence system includes a plurality of input components, each input component having an output signal with at least one of a channel and event and a data set. Also included is a display operably coupled to the input components for outputting the output signals. A controller is provided for selecting one of the input components. Additionally, a processor operably coupled to the input components, the controller, and the display, is provided. The processor is for generating a channel banner for output on the display wherein the channel banner includes a plurality of basic fields updatable with the data set, and wherein the basic fields retain a form regardless of the selected input component.

The present invention includes many advantages. Among these is that a viewer need not have to search the screen for information on a specific channel banner, and can expect that basic information will appear in the same form regardless of the source. Also, if other information is provided, this information will appear in the same portion of the screen so the viewer need not have to search the screen for information as the viewer alternates between sources.

The present invention describes convergence systems, computers, computer-readable media and methods of varying scope. Still other and further aspects, advantages and embodiments will be described in the detailed description of the preferred embodiments with reference to the accompanying drawings.

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1A:
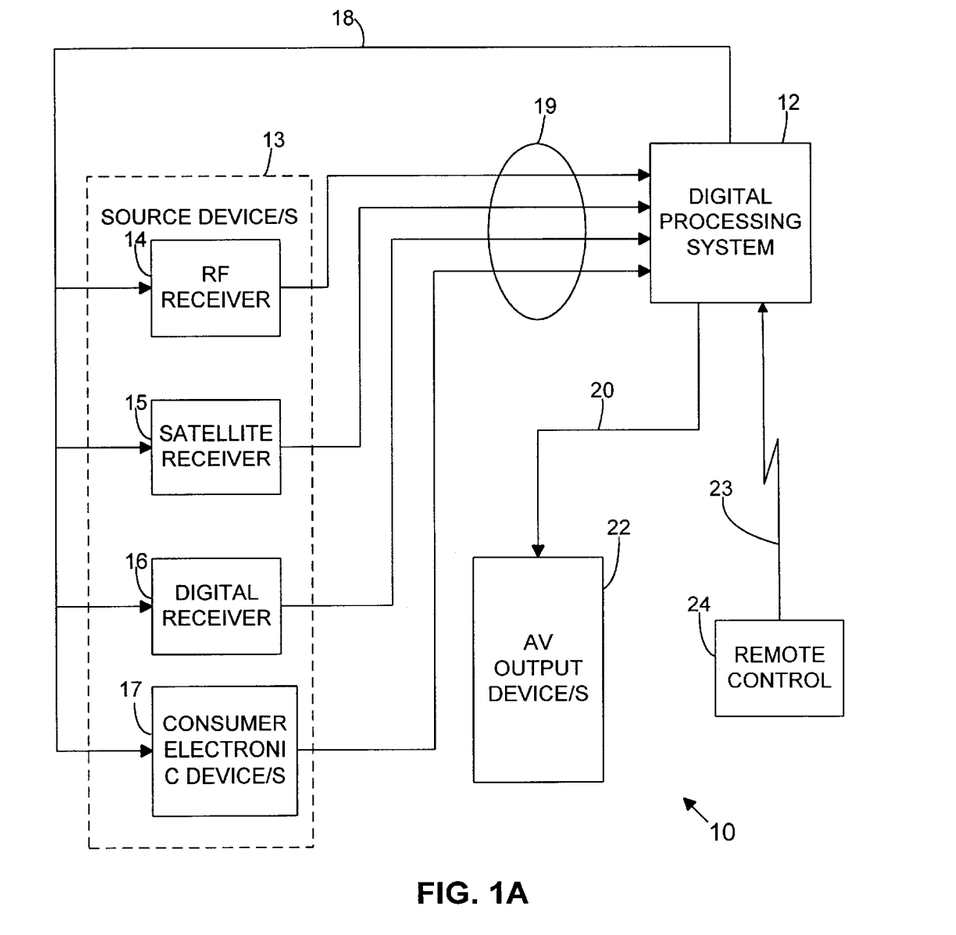
FIG. 1A is a schematic diagram of a system context suitable for incorporating the teachings of the present invention.

FIG. 1A shows a schematic diagram of an exemplary system context 10 suitable for incorporating the teachings of the present invention. System 10 includes a digital processing system 12, which can be in the form of a personal computer or other suitable processing apparatus. In one embodiment, The digital processing system 12 may be communicatively connected to a CD-ROM player or to a wide area network such as the Internet. System 10 also includes a plurality of source devices 13 such as a radio-frequency receiver 14, a satellite receiver 15, and a digital receiver 16, and consumer electronic devices 17 such as a videocassette recorder, digital video disc (digital versatile disc), laser disc, video camera, or the like. The source devices 13 typically can be configured to receive inputs as well as provide outputs. The above described components can be collectively considered to be source devices 13 in that they provide the channels or events to the convergence system 10. Those skilled in the art know that a convergence system can include additional or cumulative source devices 13 or subsets or permutations thereof. Additionally, system 10 includes an audio-visual output component 22 that may include a monitor (display), speakers, and associated elements, and an input component 24, that can take the form of the commonly referred to "remote control," which may include a pointing device such as a mouse, a keyboard, or the like, for inputting a plurality of user-desired functions.

The system 10 can be suitably coupled together in a variety of configurations. For example, FIG. 1A shows a system where the processor 12 is a hub and all other elements, i.e. source devices 13 and output 22, are connected through the processor 12. The source devices 13 are individually connected through the processor 12 and receive inputs from the processor 12 along a source device control signal line 18, and provide inputs to the processor 12 along source input signal lines 19. All controls of the source devices 13 are provided through the processor 12 also, and thus the remote control 24 provides inputs to the processor 12, rather than the source devices 13, as indicated along 23, which may be a wireless or a physical connection. The output 22 is connected to and controlled by the processor 12 along line 20.

Figure 1B:
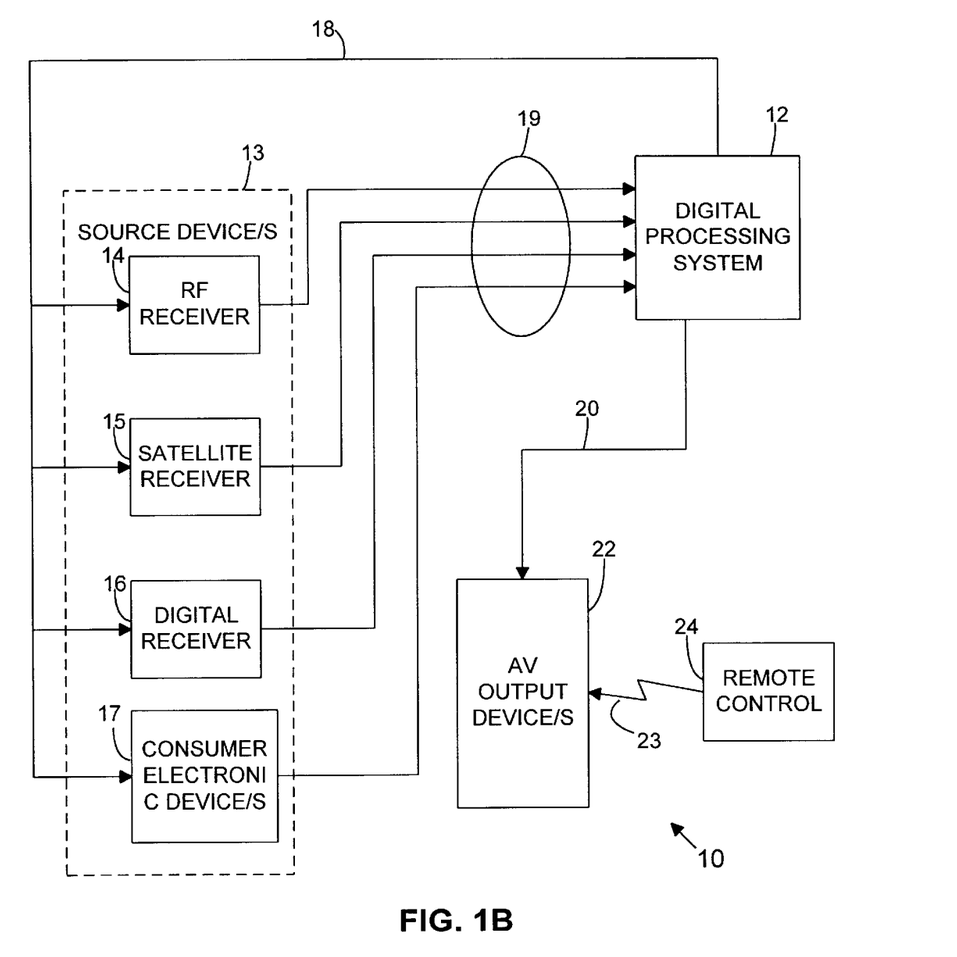
FIG. 1B is another schematic diagram of a system context suitable for incorporating the teachings of the present invention.

FIG. 1B shows the components of system 10 coupled in an arrangement similar to that shown in FIG. 1A. However, the remote control 24 provides a signal 23 to the output 22 rather than the processor 12. The output 22 is in two way communication with the processor 12 along line 20. Thus, the input signals from the remote control 24 are provided to the processor 12 through the output 22.

Figure 2A:
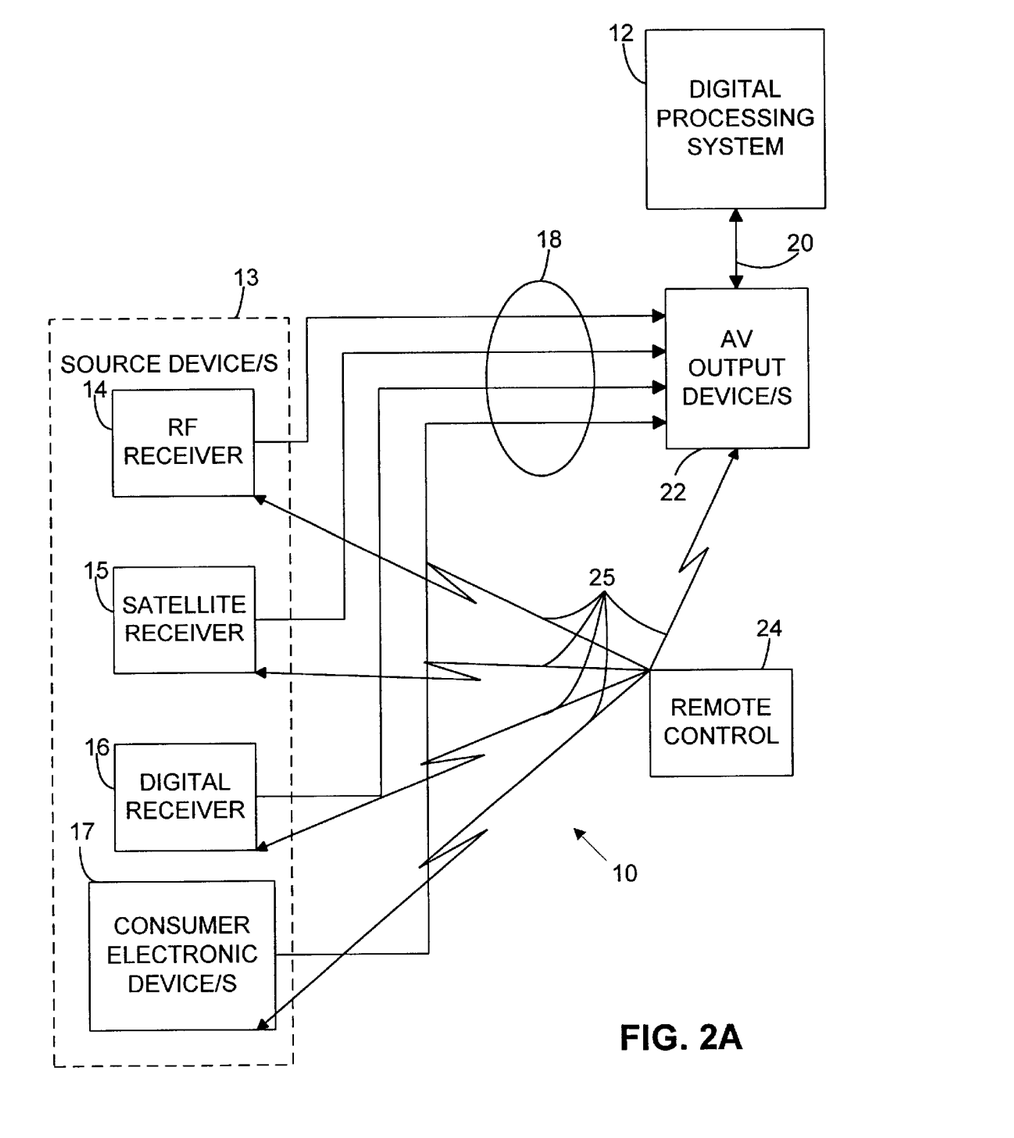
FIG. 2A is another schematic diagram of a system context suitable for incorporating the teachings of the present invention.

FIG. 2A shows the components of the system 10 coupled in an arrangement which differs from the embodiment shown in FIGS. 1A and 1B. However, like elements are referred to by like reference numerals. In the connections shown in FIG. 2, the processor 12 is not the hub of the system 10. Instead, the input device 24 directly controls the source devices 21 and the output 22, as indicated in connections 25 which may be physical or wireless. Further, the source devices 13 are connected directly to the output 22, rather than through the processor 12. Specifically, the source input signals 18, connected to the processor 12 in FIG. 1, are now directly connected to the output 22. In the embodiment shown in FIG. 2, source device control signal lines 24 remain connected between the processor 12 and the source devices 13. In each of the described configurations, the electrical connections can be physical or wireless.

Figure 2B:
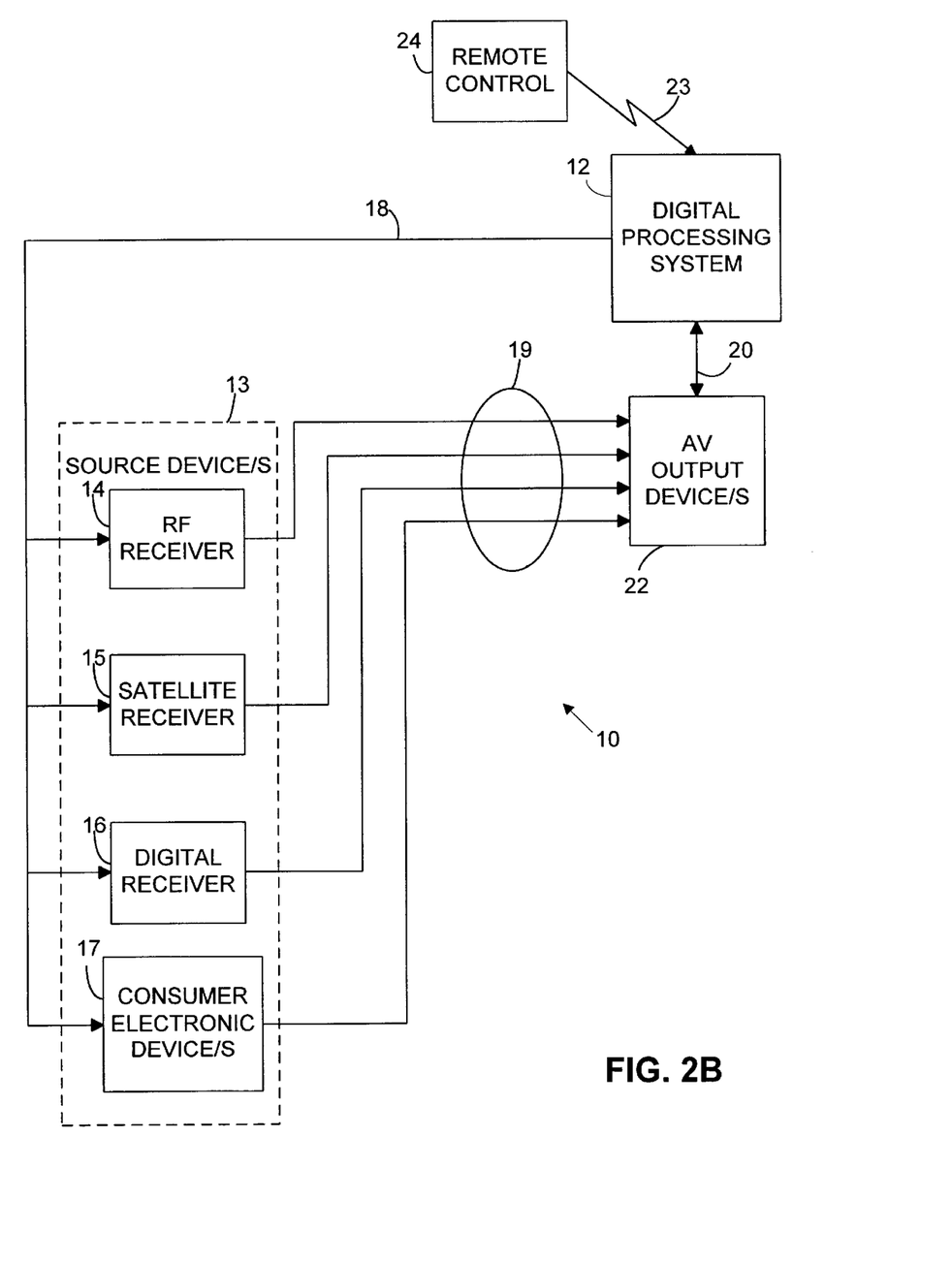
FIG. 2B is another schematic diagram of a system context suitable for incorporating the teachings of the present invention.

FIG. 2B shows an alternate configuration to the system 10 shown in FIG. 2A. Specifically, the remote control 24 provides only one signal 23, and this signal is directed to the processor 12, which performs the functions on the system. Those skilled in the art now know that alternative configurations are available. For example, the processor 12 can act as a hub for some of the source devices 13, whereas others can be directly controlled by the input device 24 and directly provide input signals to the display 22. Also, some source devices 13 can be directly connected to one of the input device 24 or the display 22, but connected through the processor 12 for the other of the input device 24 and the display 22. For example, the input device 24 can operate directly on the processor 12, output 22, or the output 22 and source devices 13. These connections are merely examples, and other connections are included within the-scope of the present invention.

The system 10 is coupled together to form what is known in the art as a convergence environment such that system 10 provides capabilities beyond ordinary personal computer or television operation. For example, the Gateway Destination PC/TV system, available from Gateway 2000, Inc., of North Sioux City, S.Dak., provides such a convergence environment. Embodiments of the present invention are amendable to inclusion into a software architecture of a computerized convergence system as described in co-filed and co-assigned application entitled "Architecture for Convergence Systems," which is hereby incorporated by reference. Briefly, the computerized convergence system includes views, overlays and system services. The views provide a graphical user interface which may be associated with a particular application. An example of a view is a full-screen television window in which a television program or the like may be viewed. The overlays provide a partial graphical user interface cooperating with and consistent over the views. An example of an overlay is a channel banner which displays the current channel and information on other channels. The system services provide common functionality or user interfaces shared by the views and overlays.

Figure 3:
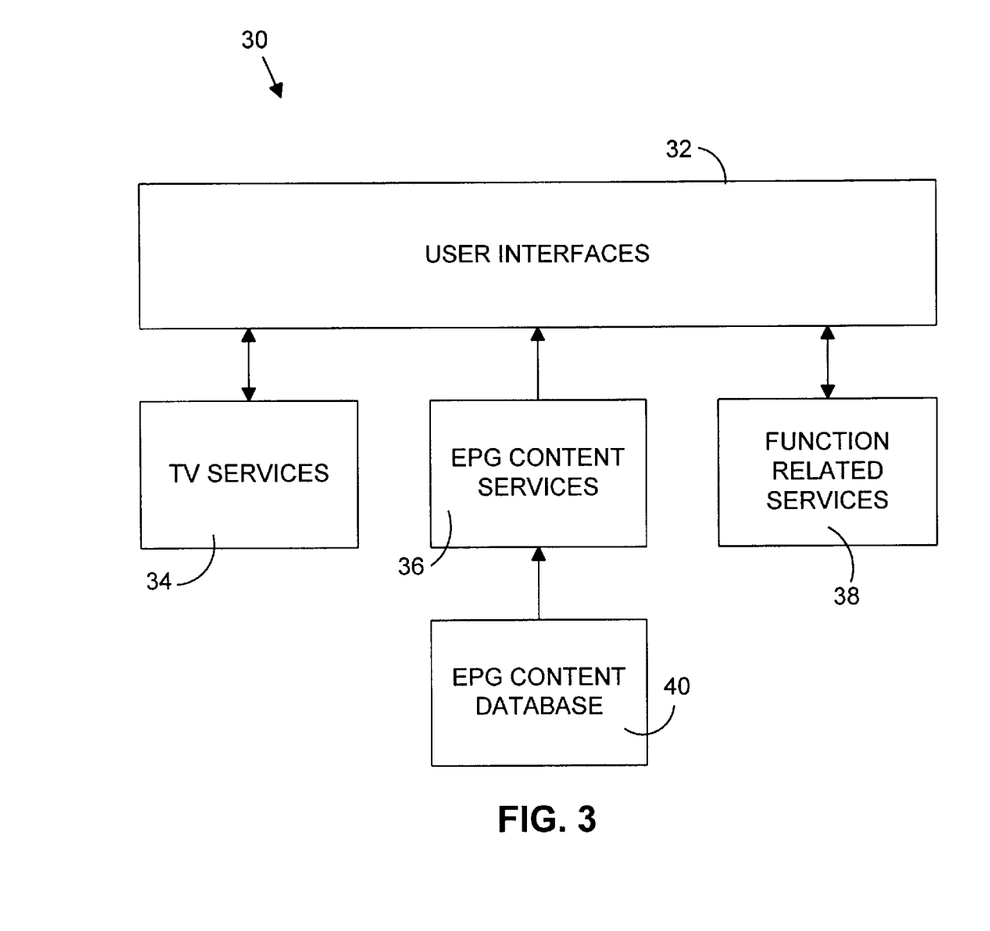
FIG. 3 is a functional block diagram of a system embodying features of the present invention.

FIG. 3 shows a functional block diagram of the major components of an embodiment of the present invention. System 30 includes four major components such as a user interface component 32, a television services component 34, an electronic program guide (EPG) content services component 36, and function related services component 38 connected to each other as shown. The television services component 34 functions to select various input devices, such as receivers 14, 16, and 18, computer 12, or consumer electronic devices 20, for display and output on the monitor and speakers 22 and tunes to channels on these devices. The function related services component 38 operates for purchasing pay events, watching events, recording events, locking events, scheduling reminders, adding channels to "favorite" lists, and other functions related to channels and events. The EPG content services component 36 functions to retrieve a database 40 which includes events and channels from in-band program guides or out-of-band program guides and loads electronic program guide type data from data services. Such data services may be communicated through a modem, over the Internet, over a satellite, through a vertical blanking interrupt of a television program, or the like. Database 40 also provides an application program interface for accessing the data and common user interface for configuring loading functions. The EPG data services may be used to determine what is programmed to be television on a channel at a given time, the EPG data services may then call channel map services to determine the corresponding channel and device, and then load relevant EPG if necessary before returning the requested information to the application.

The user interface component 32 provides overlays that display channel and event information as obtained from the EPG content services component 36 via the monitor of the output component in accordance with the video output from the television services function 34. In one embodiment of the invention, an overlay includes currently selected channel and event information. Additionally, a second overlay can be provided to include event information for channels other than that which correspond with the video. The second overlay can include information for a user selected channel at a user-selected time. The second overlay can provide feed-back for user-selected functions which permit the user to access the function-related services component 38 with a remote control 24. For example, the second overlay can be used to "surf" for information on channels and events and to program a video cassette recorder to record any selected channel, all without interrupting the current event.

Figure 4:
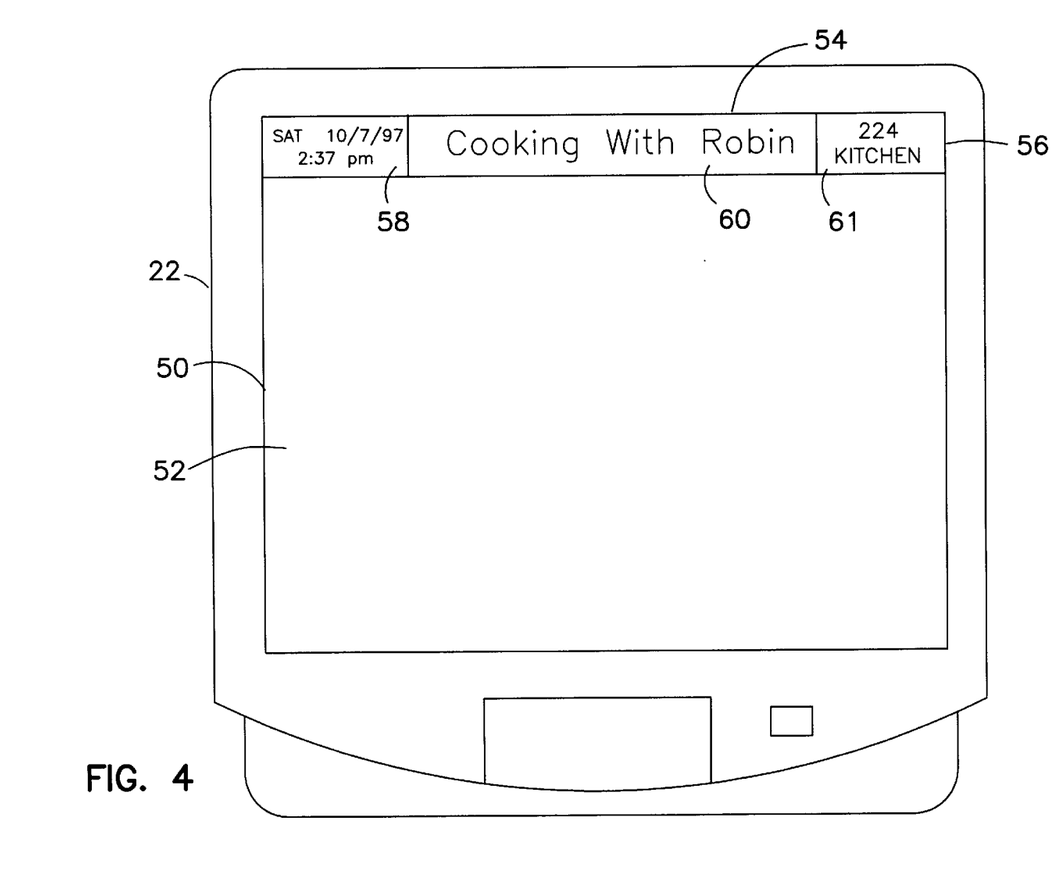
FIG. 4 is a schematic view of a screen generated by the system shown in FIG. 3.

FIG. 4 shows a schematic example of a screen 50 as provided by system 30 and output on a monitor of the output component 22. Screen 50 includes a video 52 as provided from a receiver 14, 16, or 18, or the like, through television services component 34. Also, screen 50 includes an overlay in the form of a channel banner 54. The channel banner 54 includes a plurality of fields such as date/time field 58, current event field 60, and current channel field 61. Such fields are presented in the embodiment as basic fields 56 in that they contain information applicable to most, if not all, of the source components 21. The channel banner 54 can be positioned at any selected or desired portion of the screen 50. This placement can be preselected by the system or be user selected. Further, the channel banner 54 can overlay the video 52, or the video 52 can be compressed when the channel banner 54 is activated. The channel banner can be opaque, semi-transparent, or otherwise. The present invention is not limited to a particular form or forms of channel banner.

The channel banner 54 includes information regarding a current event, i.e., the event which appears on the video at any given time. Date/time field 58 includes such information as the current date and time and is maintained continuously. Current event field 60 includes such information as the name of the current event. Current source field 61, as shown in FIG. 4, includes such information as the channel name and number of the current event. The information provided in the channel banner 54 changes with time and with the current event such that it corresponds with the current date, time and event that appears on video 52. The described fields 58, 60, 61 are merely exemplary, and those skilled in the art now know that other fields may be added or substituted in the overlay 54.

In accordance with a preferred embodiment of the invention, the channel banner retains the same form regardless of the accessed source component. Furthermore, the overall layout of the fields remains generally the same, with only the information within each field changing as necessary to reflect the content provided by the source component. In one example, most, if not all, sources provide information to the basic fields 56, such as date/time, event, and source information. The layout and form of the basic fields remain the same, with only the content changing. In the preferred embodiment, if a particular source 21 does not include information for a basic field 56, that field is left blank rather than deleted on the screen in order to maintain a consistent form for the channel banner 54.

Certain sources 21 may require additional fields only applicable to that source. For example, if the source is a prerecorded video tape from a video cassette player, a field may be provided which indicates how much running time remains on the tape. In this particular example, this field would not have much utility if the source was a personal computer. In such cases, the overlay can provide for a section of the channel banner to display additional fields when necessary. In the embodiment shown, there is no constantly displayed section that includes alternate fields. Only the basic fields are displayed, in a form consistent for all the sources.

Figure 5:
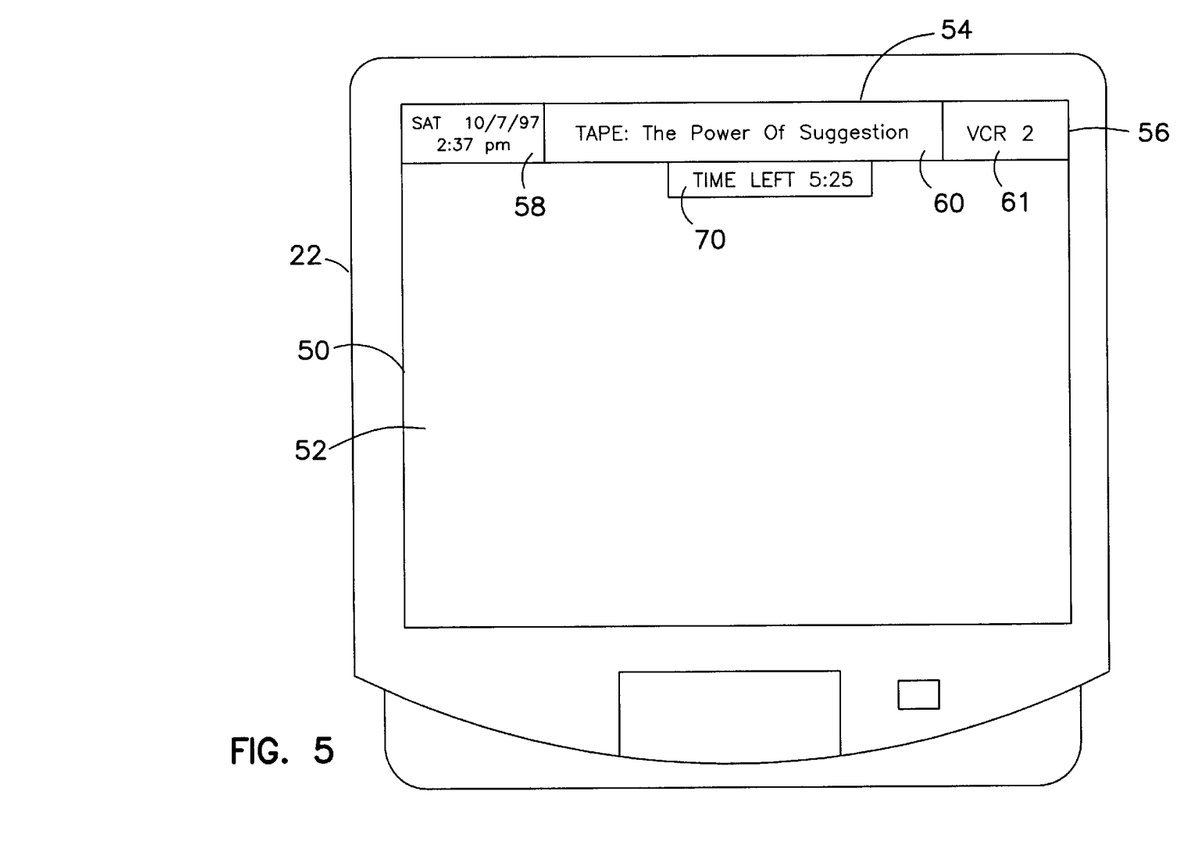
FIG. 5 is a schematic view of another screen generated by the system shown in FIG. 3.

FIG. 5 shows the schematic example of screen 50 of FIG. 4, where like elements are represented by like reference numbers, wherein the channel banner includes an additional field 70 and corresponds with a data set provided by a video cassette recorder. The additional field will appear in a region of the channel banner which is not typically displayed on the screen except for additional fields when provided by the source. In the example shown the source is a prerecorded video tape from a video cassette player as indicated in the current source field 61. The additional field 70 is a field which indicates how much running time remains on the tape. In one embodiment, the user may program the system to not display additional fields. If, however, additional fields are enabled, the particular region of the channel banner will be used for additional fields corresponding with other sources, when provided, so that the viewer need not search the screen for the information.

Figure 6:
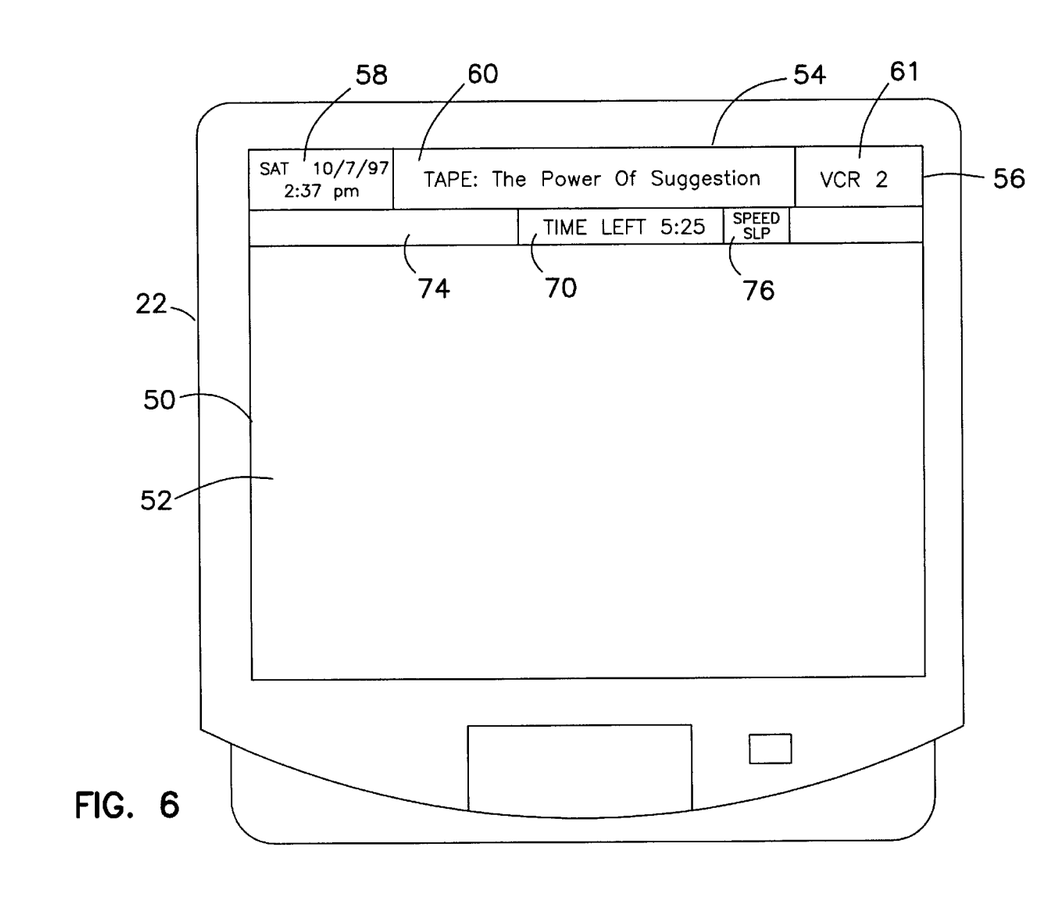
FIG. 6 is a schematic view of still another screen generated by the system shown in FIG. 3.

FIG. 6 shows an alternative to the schematic example of screen 50 of FIG. 5 where like elements are represented by like reference numbers, wherein the channel banner includes a section 74 which is always displayed regardless of whether or which additional fields 70 are provided by the particular source. In the embodiment shown, the standard overlay includes a section 74 to be filled in with additional fields as they become necessary. FIG. 6 also shows a second additional field 76 in section 74. As a further alternative, the viewer can program the system to select the channel banner shown in FIG. 5 or in FIG. 6, and alternate between the two as particular preferences may vary.

In the embodiments described above, thus, a viewer need not have to search the screen for information on a specific channel banner, and can expect that basic information will appear in the same form regardless of the source. Also, if other information is provided, this information will appear in the same portion of the screen so the viewer need not have to search the screen for information as the viewer alternates between sources.

Figure 7:
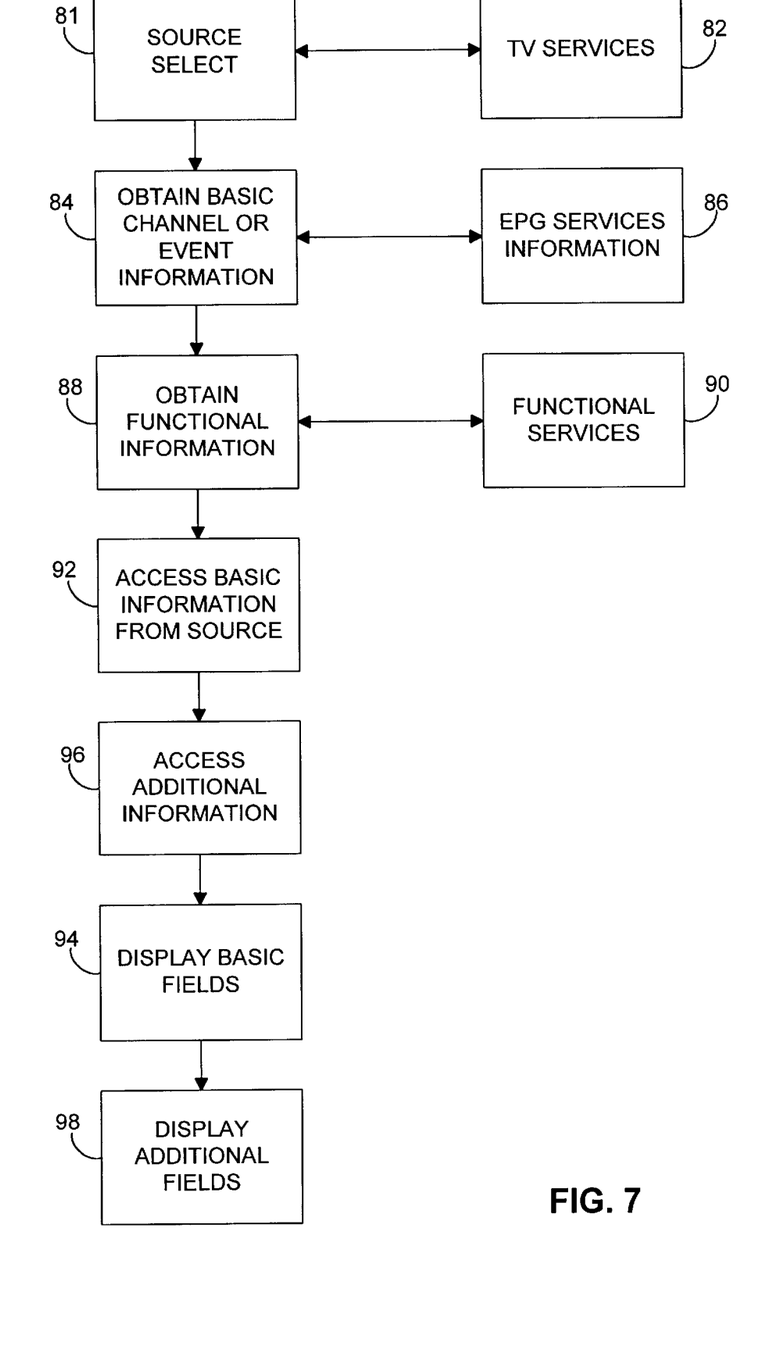
FIG. 7 is a flow diagram of a method embodying features of the present invention.

FIG. 7 shows a block diagram of the operation of the system. The user selects a particular channel or source 81 with the remote control, or the like, and in the case of a television channel, the system obtains the channel from television services and provides it to the user interface 82. The user can select a channel either by its name or channel number. The system then updates the user interface with basic information regarding the selected channel 84 with data provided by the EPG content services 86. Such basic information includes the name of the event, the parental rating of the event, whether a web site, close captioning, or alternate language simulcast are available, etc. The system then updates the user interface with functional information regarding the selected channel 88 with data provided by the function related services 90. Functional information can include any pre-stored information regarding the selected channel, time or event, etc. For example, functional information can include an indication of whether the selected channel is parentally locked, whether a favorite list is active, or whether the particular event is being recorded. If a playback device is selected, the system updates the user interface with information provided from the specific media. Additionally, the system accesses function related services for functional information regarding the playback device or its program.

The information is provided to the user in the form of an overlay, created by the user interface. The user interface provides a basic graphical user interface having a plurality of updatable fields. The fields are separated into basic fields containing information provided from all relevant sources, and additional fields suitable for providing content specific information. The user interface access the basic information provided by the source 92, updates the respective fields, and displays a channel banner 94. With regard to the additional fields, the user interface accesses relevant additional information and displays this information in multipurpose fields 96, displayed in the same location on the screen regardless of the source, but which include content specific information 98.

Although the present invention has been described with reference to preferred embodiments, workers skilled in the art will recognize that changes may be made in form and detail without departing from the spirit and scope of the invention.

What is claimed is:

1. A computer-readable medium having computer-executable components stored thereon for execution on a suitably equipped computerized system, the components including:

a television services component for receiving a plurality of inputs from a plurality of sources, wherein each input includes a corresponding data set; and a user interface component for providing a partial-screen graphical user interface in response to the data set of a selected source;

wherein the graphical user interface includes a basic field for display in a consistent form regardless of the selected source, wherein the consistent form comprises a same displayed location and format of the basic field regardless of the selected source.

2. The computer-readable medium of claim 1 wherein the graphical user interface includes a plurality of basic fields for display in a form regardless of the selected source.

3. The computer-readable medium of claim 1 wherein the graphical user interface includes a source-specific additional field.

4. The computer-readable medium of claim 3 wherein the additional field is selectively displayed.

5. The computer-readable medium of claim 3 wherein the graphical user interface includes an additional fields section, and wherein the additional fields section includes the source-specific additional field.

6. The computer-readable medium of claim 5 wherein the additional fields portion includes a plurality of source-specific additional fields.

7. A method suitable for use with a convergence system, the method comprising:

providing a plurality of sources, each source having an input having associated therewith a set of information;

displaying a channel banner having a plurality of fields for receiving and displaying at least some of the set of information;

selecting one of the plurality of sources; and displaying at least some of the set of information from the selected source in the plurality of the fields;

wherein the plurality of fields retains a consistent form regardless of the selected source, wherein the consistent form comprises a same displayed location and format of the plurality of fields regardless of the selected source.

8. The method of claim 7 wherein the step of displaying a channel banner includes displaying at least one additional field which includes source-specific information.

9. The method of claim 7 wherein the step of displaying at least some of the set of information includes accessing an electronic program guide database for a first information and a functional database for additional information, wherein the set of information includes the first information and the second information.

10. The method of claim 7 and further comprising the step of displaying a video output associated with the selected source.

11. A convergence system, comprising:
  a plurality of input components, each input component having an output signal with at least one of a channel and event and a data set;
  a display operably coupled to the input components for outputting the output signals; and
  a controller for selecting one of the input components; and
  a processor operably coupled to the input components, the controller, and the display, the processor for generating a channel banner for output on the display wherein the channel banner includes a plurality of basic fields updatable with the data set wherein the basic fields retain a consistent form regardless of the selected input component, wherein the consistent form comprises a same displayed location and format of the basic fields regardless of the selected input component.

12. The convergence system of claim 11 wherein the plurality of input components includes at least one television receiver and at least one personal computer.

13. The convergence system of claim 12 wherein the at least one television receiver is one of a radio-frequency receiver, satellite receiver, and digital receiver.

14. The convergence system of claim 12 wherein the plurality of input components also includes a consumer electronic device.

15. The convergence system of claim 11 wherein the processors receives inputs from an electronic program guide database.

16. The convergence system of claim 11 wherein the channel banner includes at least one additional field for displaying information dependent on the selected input component.

* * * * *